April 25, 1961  B. J. GAVRISHEFF  2,981,143
DIP ANGLE MEASURING DEVICE
Filed March 1, 1957  3 Sheets-Sheet 1

INVENTOR
BORIS J. GAVRISHEFF

BY W. R. Maltby
Richard C. Reed  ATTORNEYS

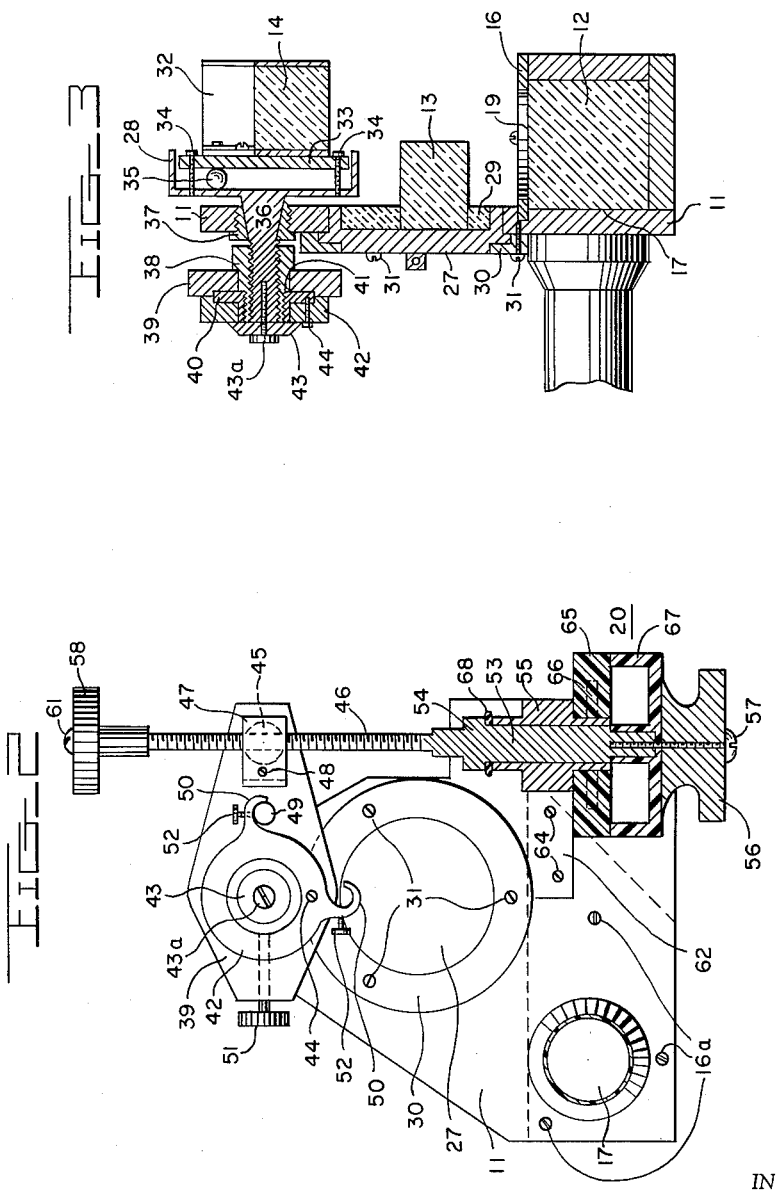

April 25, 1961   B. J. GAVRISHEFF   2,981,143
DIP ANGLE MEASURING DEVICE
Filed March 1, 1957   3 Sheets-Sheet 3
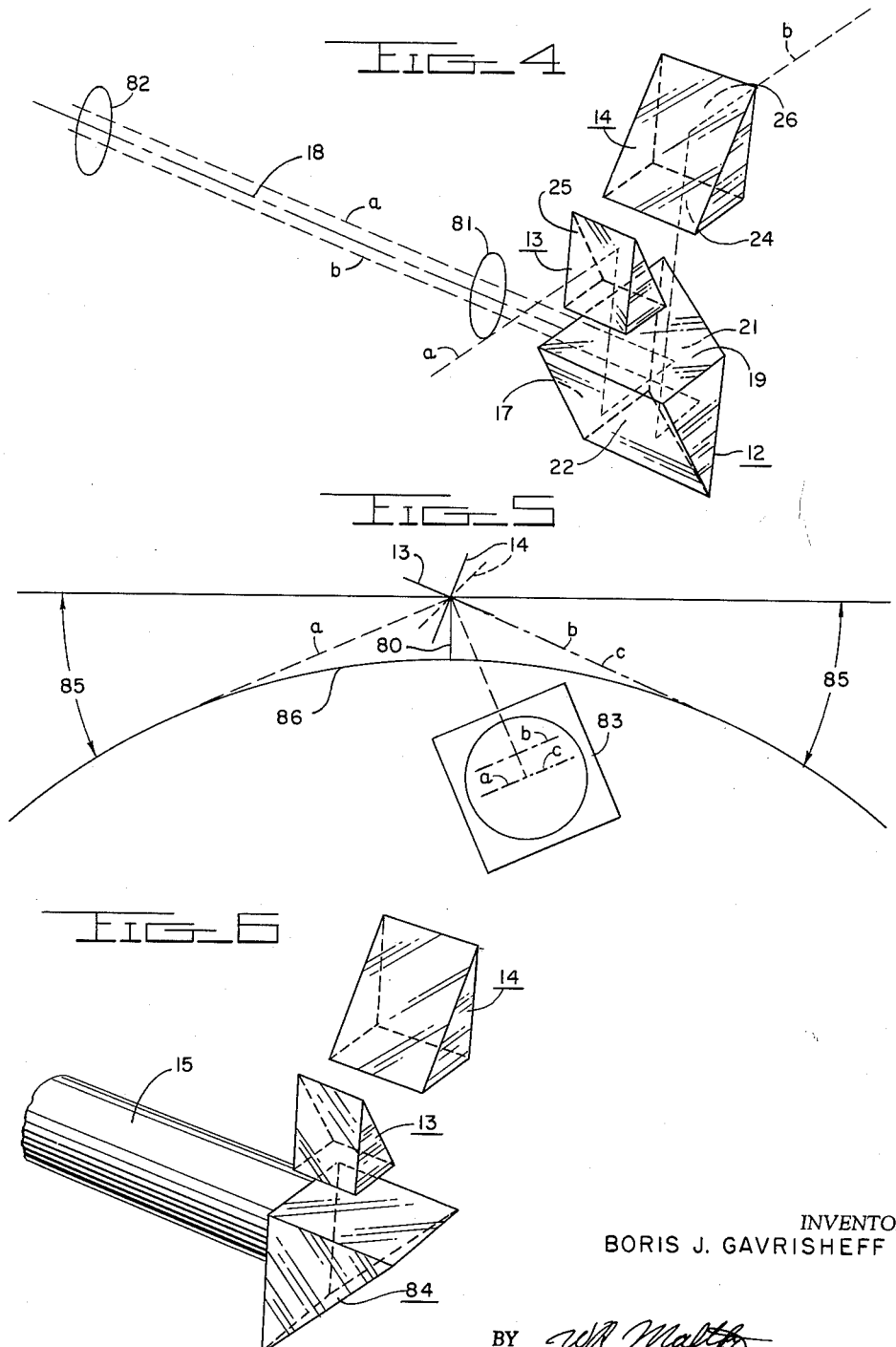
INVENTOR
BORIS J. GAVRISHEFF
BY
ATTORNEYS

United States Patent Office 2,981,143
Patented Apr. 25, 1961

2,981,143
DIP ANGLE MEASURING DEVICE
Boris J. Gavrisheff, 1718 35th St., Washington 7, D.C.
Filed Mar. 1, 1957, Ser. No. 643,484
4 Claims. (Cl. 88—2.4)
(Granted under Title 35, U.S. Code (1952), sec. 266)

The invention described herein may be manufactured and used by or for the Government of the United States of America for governmental purposes without the payment of any royalties thereon or therefor.

The present invention relates to optical devices and more particularly to a device for determining the magnitude of the angle between the true horizon and the visible horizon known as the angle of dip when making celestial observations for determining positions.

Altitudes of celestial bodies, measured from the visible sea horizon as a reference, are too great by the amount of dip. Since dip arises from and varies with the elevation of the eye of the observer above the surface of the earth, the correction for dip is sometimes called Height of Eye correction. When determining positions by observing celestial bodies it is necessary to make correction for the amount of dip.

The present method of determining the dip angle makes use of precomputed tables which are based on the height of the observer's eye above the surface at the locality where the observation is being made. These tables are geometrically derived to represent the mean state of the varying atmosphere and therefore only rarely represent the conditions existing at the time of the observation, consequently, the best tables will give only theoretical values of dip and have to be corrected for the change in refraction. These tables have other drawbacks wherein, they are good for only the localities at which they were made and therefore different tables should have to be used for different localities.

For all purposes throughout the specification and claims, dip is the vertical angle, at the eye of an observer between the horizontal and the line of sight to the visible horizon.

It is therefore an object of the present invention to provide an instrument which will determine the angle of dip without the use of additional tables, etc., when making celestial observations for determining positions.

Another object is to make a simple, compact and relatively inexpensive device for directly determining the angle of dip.

Yet another object is to provide a dip measuring device which has minimum error and adjustments and does not require experienced personnel to operate.

Other and more specific objects of this invention will become apparent upon a more careful consideration of the following detailed description when taken together with the accompanying drawings, in which;

Fig. 2 is a rear view of Fig. 1 illustrating the adjusting mechanism in section and the parts for rotating the upper prism;

Fig. 3 is a cross sectional view along lines 3—3 of Fig. 2 illustrating the relative parts for permitting rotation of the upper prism;

Fig. 4 is a perspective view of the optical system of the present invention illustrating the path of the light rays from the horizon to the observer's eye;

Fig. 5 is a diagram illustrating the dip angle;

Fig. 6 is a perspective view of the optical system of a modification of the instrument of Fig. 1.

Figure 1:
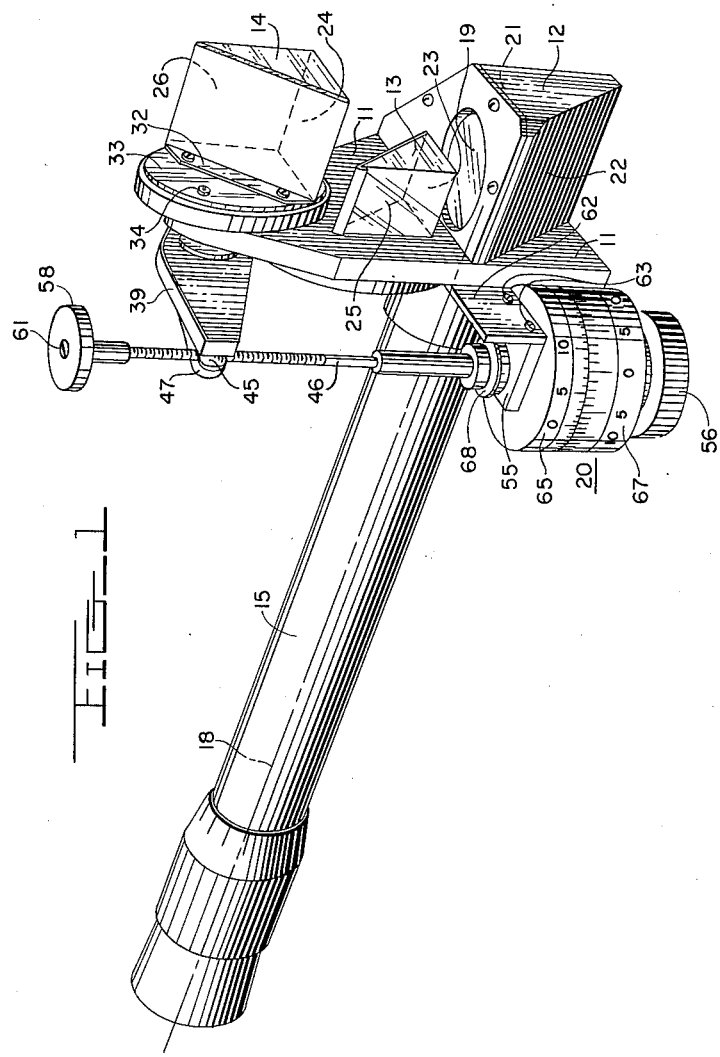
Fig. 1 is a perspective view of the device of the present invention.

In accordance with the teaching of the present invention an instrument is provided for directly measuring the angle of dip by determining the angle with prisms positioned relative to each other such that light rays from two portions of the horizon may be made to coincide along the axis of an astronomical telescope. The device comprises either a Galilean or astronomical telescope providing respectively a direct or inverted image magnified two to four times with a system of three separate prisms optically coupled with the telescope. Two of the prisms are small right angular totally reflecting prisms located above a larger prism which may be either a right angle or a Porro-Abbe type. The two small right angle prisms are usually facing in opposite directions with their bottom faces parallel to the upper face of the larger prism and positioned to receive light rays from two opposite points on the horizon and reflects the rays onto the upper face of the larger prism which then reflects the rays along the optical system of the telescope. When the two right angular prisms receive light rays from the same relative angle the rays coincide along the axis of the telescope and appear as one ray at the ocular of the telescope. One of the small right angle prisms is stationary and the other is rotatable about the axis passing through the middle of its hypotenuse and therefore the bottom face thereon can be parallel to the top face of the larger prism or adjusted to an incline. When measuring the angle of dip, the rotatable prism will be at an incline to the upper face of the larger prism and the mechanism that rotates the prism has a graduated scale thereon which will indicate the number of minutes of a degree for the angle required to make the light rays passing through the two small right angular prisms to coincide at the ocular of the telescope. The number of minutes of a degree indicated on the scale represents the angle of dip.

Referring now to the drawings, wherein like reference characters represent like parts throughout, there is shown by illustration in Fig. 1 a perspective view of the preferred device which comprises a base 11 of suitable thickness to which three prisms 12, 13, 14, and a telescope 15, preferably an astronomical erecting type are connected by suitable holders. The three prisms are positioned relative to each other as shown in Fig. 1 such that light rays will be reflected by each of prisms 13 and 14 down onto prism 12 and on through the optical system of the telescope to the observer. Prisms 12 and 13 are stationary and prism 14 is rotatable by a hand operated mechanism 20 shown in cross section in Fig. 2.

The main prism 12 is secured to the base 11 by a housing 16 and screws 16a. The main prism is a Porro-Abbe type which serves as a base for the optical train and has one of its faces 17 perpendicular to the optical axis 18 of the telescope and an upper face 19 perpendicular to face 17 with two faces 21 and 22 at a 45 degree angle respectively with each of the faces 17 and 19. Prisms 13 and 14 are totally reflecting 90° degree prisms and positioned above the main prism 12 with prism 14 located above prism 13 such that the centers of the hypotenuse of the two prisms are on the reflected optical axis of the telescope with their bottom faces 23 and 24 respectively positioned parallel to the upper face 19 of the main prism with their other faces 25 and 26 respectively positioned perpendicular to the upper face 19 with their perpendicular faces facing in opposite directions, such that each prism covers one-half the optical field of the main prism. Prism 13 is rigidly secured to the base 11 in a housing 27 whereas prism 14 is secured to an adjustable housing 28 which is rotatably secured to the base and permits rotation of the prism and is parallel to the optical axis of the telescope.

The stationary prism is held within housing 27 by any suitable means such as plaster of Paris or sealing wax 29 and the housing is held to the base 11 by a retaining ring 30 held to the base by three screws 31. The housing 27 can be rotated for adjustment of the prism and then secured in a permanent adjusted position by the retaining ring.

As shown in Fig. 3 the rotatable prism 14 is secured to the housing 28 by an end and back plate 32 secured to an adjusting mechanism 33 which is secured to the housing by screw 34. Between the adjusting mechanism 33 and the housing, two ball bearings 35 are positioned near the outer edge along the hypotenuse of the prism such that the prism may be adjusted for alignment with the upper surface 19 of the main prism.

The prism housing 28 is rotatably connected to the base by a housing extension 36 which extends from the housing along the axis through the middle of the hypotenuse of the prism and parallel to the optical axis of the telescope. The extension 36 extends through a bearing 37 that is screw threaded into an opening in the housing and is secured within the bearing by a support member 38 which is screwed onto the extension and has a close running clearance with bearing 37. Support member 38 serves as a bearing for a moving prism lever 39 which is secured over the support 38 and held against a shoulder thereon by an adjustment stop support 40 which is screwed onto member 38 and secured against a shoulder 41 such that it is in close running clearance with the moving prism lever 39. A moving prism adjustment stop 42 is secured over and against stop support 40 by a retaining washer 43 and a screw 43a which is threaded into the end of the extension 36. A screw 44 is screwed through the moving prism stop and into the adjustment stop support 40 to insure that the adjustment stop does not rotate on the support.

The moving prism lever 39 is secured at the outer end to ball shaped nut 45 threaded on the inner side for reception of a tangent adjusting screw 46 having screw threads thereon and held to the lever by a retainer 47 and screw 48. The lever 39 has a stop peg 49 secured thereto along the outer edge of the moving prism adjustment stop and positioned to be contacted by extensions 50 on the adjustment stop member which are positioned 90 degrees apart in order to limit rotation of the movable prism to exactly 90 degrees. The moving prism lever has a set screw 51 in the end opposite the ball nut whereby the set screw can be adjusted against member 38 in order to secure the movable prism housing extension 36 to lever 39 such that one of the extensions 50 will be positioned against the stop peg 49, by loosening the screw 51 the prism can be rotated to a different position. The extensions 50 have screws 52 passing therethrough for the purpose of adjusting the prism for a rotatable movement of exactly 90 degrees.

As shown in Fig. 2 the moving prism lever 39 is raised or lowered by the ball nut through rotation of the adjusting screw 46. The adjusting screw is formed with threads on the upper portion and a shank 53 on the lower portion which has an enlarged portion 54 at the upper portion of the shank. The shank passes through a bearing 55 and is secured therein by the enlarged portion 54 being positioned above the bearing surface and a lower knurled knob 56 which is secured to the end of the shank of the adjusting screw by a retaining screw 57. The adjusting screw is screwed through the ball nut 45 such that the nut is centrally located along the threaded portion to set lever 39 such that prism 14 is positioned correctly relative to the larger prism. An upper knurled knob 58 is secured to the upper end of the adjusting screw by a screw 61.

Bearing 55 is secured to a bearing support 62 by screws 63 and the bearing support 62 is secured to base 11 by screws 64. The bearing has a vernier graduated drum 65 secured over the lower portion thereof by a retaining screw 66 and between the drum 65 and the lower knurled knob 56, a minutes graduated drum 67 is secured between the end of the adjusting screw and the lower knob such that the minutes drum rotates with the adjusting screw when the knurled knob retaining screw is tightened against the knob. A fiber washer 68 is situated between the enlarged upper portion 54 of the shank and the bearing 55 to prevent a metal to metal contact, and a steel spring 71 is positioned above the enlarged upper portion 54 to prevent the adjusting screw from moving upwardly.

The ball shaped nut 45 is positioned relative to the axis about which the rotatable prism rotates such that the axis of the adjusting screw is tangent to a circle formed with the axis of the rotation of prism 14 as the center and the threads on the adjusting tangent screw 46 is such that rotation of drum 67 one revolution will move the prism 14 through an arc of one degree. Since rotation of the drum one revolution moves the prism one degree, the rotatable drum is calibrated in minutes of arc and the vernier graduated drum 65 will designate tenths of a minute. As an example, in the illustrated model of Fig. 1 the adjusting screw has fifty threads per inch such that one revolution of the drum will advance the nut and the movable prism lever 0.02 inch, for this advancement, the length of the lever 39 from the axis of the housing extension to the axis of the adjusting screw must be 1.1458 inches. For all practical purposes the dip angle is small and for this reason the rotating drum is calibrated in minutes in each direction from zero such that movement of one-half revolution in either way will indicate 30 minutes of arc. The distance between the axis about which the prism 14 rotates and the axis of the tangent screw 46 should be as short as possible in order to make a very small arc through which the lever moves.

Fig. 4 is a perspective view of the optical system illustrating the relationship of the prisms and the path of light rays passing through the optical system. The stationary prism 13 and the rotatable prism 14 are facing in opposite directions such that light ray $a$ is incident on face 25 of prism 13, passes through the prism and is reflected by the back surface down through face 23 onto face 19 of the main prism 12. Prism 14 receives light ray $b$ on face 26 and the ray passes through the prism to the back surface and is reflected through face 24 onto face 19 of prism 12. Light rays $a$ and $b$ are incident on separate halves of the optical field of prism 12 and pass through the prism to face 22 where they are reflected to face 21 and reflected by face 21 through face 17 and along the optical axis 18 of the telescope through the objective lens 81 and the ocular 82 to the eye. When light rays $a$ and $b$ are incident respectively on prisms 13 and 14 at the same angle, the rays will coincide at the eye, if they are not at the same incident angle, the rays will not coincide at the eye and the rotatable prism 14 must then be adjusted by the adjusting screw in order to rotate the prism such that the rays will coincide. Such an illustration is shown by example in Fig. 5 wherein the prisms are positioned a distance 80 above the surface of the water 86 and are represented by straight lines with the prisms adjusted for zero reading on the vernier and the optical field of the telescope is shown by a circle on a square 83. Light rays $a$ and $b$ appear from the horizon, wherein light ray $a$ is incident on the fixed prism 13 and reflected into the center of the telescope field, light ray $b$ is incident on rotatable prism 14 and is reflected onto the telescope field but it is not reflected along the axis since the prisms are out of adjustment for measuring the dip angle therefore light ray $b$ is not coincident with light ray $a$. In order to make the rays coincide, prism 14 must be rotated and is represented in its adjusted position by a broken line and the dot-dash light ray line $c$ reflected therefrom is shown in coincidence with light ray $a$. This means that the light rays from the horizon strikes the prisms at the same angle and the angle of the light rays with respect to the horizontal is a measure of the dip angle 85.

Fig. 6 illustrates the optical system of a modification of Fig. 1. The device is the same in operation as that shown in Fig. 1 except the Porro-Abbe prism is replaced by a right angle prism 84 which reflects the rays directly into the telescope from the prisms 13 and 14. In this modification the rays appear at the eye piece on a vertical plane rather than a horizontal plane as in the device of Fig. 1 and when the rays are not in coincidence they will appear either to the right or left of the axis rather than above or below in a horizontal plane as in the device of Fig. 1, as shown in Fig. 5.

In operation of the device of Fig. 1, the device is calibrated such that faces 25 and 26 of prisms 13 and 14 are parallel to each other and perpendicular to the top surface of the main prism 12 and facing in opposite directions. When the faces 25 and 26 are exactly parallel those light rays which are on a horizontal will appear in coincidence at the eye piece. When high upon a ship and determining the dip angle, the rays of the horizon will be incident on the prisms at an angle such that they do not coincide without adjusting the rotatable prism. The device is held with the telescope in one hand and the knurled knob of the adjusting screw in the other hand such that prisms 13 and 14 are above the main prism and face in opposite directions whereby light rays from two opposite portions of the horizon are seen as two horizontal lines at the eye piece of the telescope. By rotating the device slightly in the direction of the stationary prisms and adjusting the adjusting screw 46 to rotate the rotatable prism 14, the two opposite rays will be made to coincide along the axis of the telescope and appear as one line. When the light rays are in coincidence it indicates that the light rays are incident on prisms 13 and 14 from the same angle and the angle made with the horizontal required to make the rays coincide will be indicated by the reading of the minutes drum and the vernier drum. This reading will be a measure of the dip angle.

Dip angle is very small so the prism does not have to be rotated very much to make the oppositely disposed rays coincide, for instance, standing on a ship so that the height of the eye is 158 feet above the surface of the water, the dip angle will be only 11.9 minutes.

Elimination of instrumental error can be accomplished by taking a reading of the dip angle with the prisms up as described above, and then rotating the instrument 180 degrees and taking a second reading for the dip angle. If there is a slight difference, one half of the sum of the two readings will give the correct magnitude of the dip angle. This is true due to the fact that in the second observation the prism is rotated in a contrary direction, so, if the first observation was too large, the second observation would be too small and would correct itself by taking one half of the sum of the readings.

In order to calibrate the device, prisms 13 and 14 are positioned to face in the same direction by rotating the rotatable prism through 90 degrees and then the adjusting screw is rotated until the light rays from each of the prisms coincide. If the zero of the minutes graduated drum 67 does not align with zero of the vernier drum 65, the retaining screw 57 can be loosened and the minutes drum rotated until the zero marks align. The retaining screw 57 is then tightened again and the faces 25 and 26 of the prism should be parallel to each other and perpendicular to the upper face 19 of the main prism. The prism 14 is then rotated back 90° so that it is facing in opposite directions to that of prism 13. Rotation of the prism 14 through 90 degrees positions different faces of the prism for incidence of rays from opposite direction.

The cover plates along the hypotenuse of prisms 13 and 14 and the sides of the cover plate about the Porro-Abbe prism 13 adjacent the faces 21 and 22 are silvered in order to refract the incident light rays. However, the respective faces of the prisms may be coated with silver for obtaining the same result and the prisms may be secured to the base by any suitable means without departing from the invention. Also prisms 13 and 14 may be replaced by mirrors secured along the lines of the hypotenuse of each of the prisms for reflecting the incident light rays onto the main prism without departing from the invention.

Obviously many modifications and variations of the present invention are possible in the light of the above teaching. It is therefore to be understood, that within the scope of the appended claims, the invention may be practiced otherwise than as specifically described.

What is claimed is:

1. An instrument for determining dip angles which comprises an astronomical telescope, a stationary main prism, a stationary right angular totally reflecting prism, and a rotatable right angular totally reflecting prism mounted onto an adjustable housing, said stationary and rotatable right angular prisms being mounted relative to said main prism in optical alignment with said telescope, said rotatable prism being rotatably mounted on said housing and secured in one of two positions requiring a 90 degree rotation of said rotatable prism between each position relative to said housing and rotatable with said housing relative to said stationary prisms, one of said positions facing said rotatable prism in the same direction as said stationary right angular prism and the other of said positions facing said rotatable prism in a direction opposite to said stationary right angular prism whereby light rays incident on said right angular prisms will be reflected onto said main prism and subsequently reflected by the latter along the axis of said telescope, adjusting means for rotatably adjusting said housing and said rotatable prism with respect to light rays incident thereon and means for indicating in minutes of a degree the amount of rotation of said rotatable right angular prism required to reflect said light rays in coincidence with light rays reflected by said stationary right angular prism along the axis of said telescope.

2. An instrument for determining dip angles which comprises an astronomical telescope, a stationary Porro-Abbe type prism mounted with one face perpendicular to the optical axis of said telescope, two small right angular prisms mounted above said Porro-Abbe type prism in optical alignment therewith with their bottom faces parallel with the upper face of said Porro-Abbe type prism and another of their faces perpendicular to the upper face of said Porro-Abbe type prism whereby light rays incident on said perpendicular faces of said right angular prisms will be reflected onto the top face of said Porro-Abbe type prism, said Porro-Abbe type prism reflects said incident light rays along the telescope axis, one of said right angular prisms being stationary and the other of said right angular prisms being rotatably mounted onto an adjustable housing and secured in one of two positions requiring a 90 degree rotation between each position relative to said housing and rotatable with said housing relative to said stationary prisms, one of said secured positions facing said perpendicular face of said rotatable prism in the same direction as the perpendicular face of the said stationary right angular prism and the other of said positions facing said perpendicular face of said rotatable prism facing in a direction opposite to the perpendicular face of said stationary right angular prism whereby light rays incident on said right angular prisms will be reflected onto said main prism and subsequently reflected by the latter along the axis of said telescope, adjusting means for rotatably adjusting said housing and said rotatable right angular prism mounted thereon with respect to light rays incident thereon and means for indicating in minutes of a degree the amount of rotation of the rotatable right angular prism required to reflect said light rays in coincidence with light rays reflected by said stationary right angular prism along the axis of said telescope.

3. An instrument for determining dip angles which comprises an astronomical telescope, a stationary Porro-Abbe type prism mounted with one face perpendicular to the optical axis of said telescope, two small right angular prisms mounted above said Porro-Abbe type prism in optical alignment therewith with their bottom faces parallel with the upper face of said Porro-Abbe type prism and another of their faces perpendicular to the upper face of said Porro-Abbe type prism whereby light rays incident on said perpendicular faces of said right angular prisms will be reflected onto the top face of said Porro-Abbe type prism, said Porro-Abbe type prism reflects said incident light rays along the telescope axis, one of said right angular prisms being stationary and the other of said right angular prisms being rotatably mounted onto an adjustable housing and secured in one of two positions requiring a 90 degree rotation between each position relative to said housing and rotatable with said housing relative to said stationary prisms, one of said secured positions facing said perpendicular face of said rotatable prism in the same direction as the perpendicular face of the said stationary right angular prism and the other of said positions facing said perpendicular face of said rotatable prism facing in a direction opposite to the perpendicular face of said stationary right angular prism, said adjustable housing rotating said prism mounted thereon about an axis through the mid-point of its hypotenuse and parallel with the optical axis of said telescope, means adapted to rotate said adjustable housing such that said rotatable prism rotates therewith about said axis through the mid-point of its hypotenuse whereby light rays from the horizon incident on said rotatable prism will be reflected along the reflected optical axis of said telescope in coincidence with light rays reflected by said stationary right angular prism along the reflected optical axis of said telescope, said means adapted to rotate said rotatable prism about said axis having rotatable therewith a minutes of degree drum which indicates the number of minutes of degree for the angle required to rotate said rotatable right angular prism to reflect said incident light rays in coincidence with said light rays incident on said stationary right angular prism.

4. An instrument for determining dip angles which comprises an astronomical erecting type telescope, a main stationary prism, a stationary and a rotatable right angular prism, said stationary prisms connected to a base plate, said rotatable prism mounted on a housing adjustable relative to said base plate and said stationary prisms, said main prism being positioned with a first face perpendicular to the optical axis of said telescope and a second face parallel to the optical axis of said telescope and perpendicular to said first face, said stationary and rotatable right angular prisms being positioned above said main stationary prism in optical alignment therewith with the centers of their hypotenuses on the reflected optical axis of said telescope such that each covers one-half the optical field of said main prism, said stationary prism being positioned with its lower face parallel to said second face of said main prism, said rotatable prism being positioned with its lower face adjacent said second face of said main prism and rotatable with said housing about an axis parallel to the reflected optical axis that passes through the mid-point of its hypotenuse, said rotatable prism being rotatably mounted on said housing and secured in one of two positions requiring a 90 degree rotation of said rotatable prism between each position relative to said adjustable housing and rotatable with said adjustable housing relative to said base plate and said stationary prisms, one of said positions facing said rotatable prism in the same direction as said stationary right angular prism and the other of said positions facing said rotatable prism in a direction opposite to said stationary right angular prism, means connected with said adjustable housing for adjusting the position of the faces of said rotatable prism with respect to said second face of said main prism, said adjusting means being connected to said base plate and extending with the axis thereof tangent to a circle with the axis of the circle through the mid-point of the hypotenuse of said rotatable prism as its center, said adjusting means having a minutes of arc drum rotatable therewith which indicates the number of minutes of an angle through which the rotatable right angular prism has been rotated by said adjusting means with respect to said second face of said main prism.

References Cited in the file of this patent

UNITED STATES PATENTS

| | | |
|---|---|---|
| 714,276 | Blish | Nov. 25, 1902 |
| 864,237 | Fiske | Aug. 27, 1907 |
| 1,337,912 | Hughes et al. | Apr. 20, 1920 |
| 1,339,006 | Sperry | May 4, 1920 |
| 2,487,337 | Holman | Nov. 8, 1949 |
| 2,803,160 | Marston | Aug. 20, 1957 |